United States Patent Office 2,811,447
Patented Oct. 29, 1957

2,811,447

FORTIFIED CEREAL GRAINS AND METHOD OF PRODUCING THE SAME

Masaki Kamada, Higashiyodogawa-ku, Osaka, Japan, assignor to Takeda Pharmaceutical Industries, Ltd., Higashi-ku, Japan No Drawing. Application February 7, 1955, Serial No. 486,687

Claims priority, application Japan February 15, 1954

3 Claims. (Cl. 99—11)

This invention relates to improvement in the fortification of cereal grains with thiamine.

The object of the invention is to provide improved vitamin-$B_1$-enriched cereal grains and processes of manufacturing them.

More particularly, the invention deals with the rice enriched in vitamin $B_1$ activity by derivatives of thiol form thiamine and also with its manufacturing processes.

Enrichment of food with thiamine has been well known, and generally thiamine has been employed in the form of its hydrochloride, nitrate and other salts.

However, these salts, being liable to be decomposed by the moisture in the air during storage, cannot be very suitable for enrichment of food such as cereal grains, which need to be stored for a considerably long time. So, the inventor made an investigation to remove such a disadvantage in order to enrich cereal grains effectively and found out that the purpose was accomplished by using derivatives of thiol form thiamine or their salts.

According to this invention, vitamin $B_1$ activity in cereal grains is increased with derivatives of thiol form thiamine.

Cereal grains are generally washed with water before use, and, in the case of rice, it is subjected to cleaning to be sold as cleaned-rice. Through these processes of washing and polishment, most of natural vitamins in the rice will be lost. Therefore, various methods have been suggested to re-fortify it. For instance, cleaned-rice is coated with a water-soluble thin membrane in which necessary vitamins are compounded, or an edible film, containing a film-forming agent, an adhesive agent and a plasticizer, besides vitamins, is formed over grains. Such methods aim at making up for the loss of vitamins with a membrane containing these vitamins, and only hydrochloride, nitrate and other salts of thiamine have been applied for the purpose.

But in the present invention, derivatives of thiol form thiamine and their salts are employed, which have been recently introduced as 2-methyl-4-amino-5-[N-(3'-acylthio 5' - acyloxy - $\Delta^{2'}$ - pentenyl-2')]-formaminomethyl-pyrimidine.

These compounds, without toxicity, have good properties for enrichment. Especially, 2-methyl-4-amino-5-[N - (3' - benzoylthio - 5' - benzoxy - $\Delta^{2'}$ - pentenyl - 2')]-formaminomethyl-pyrimidine (referred to as D. B. T. for short) and 2 - methyl - 4 - amino-5-[N-(3'-acetylthio-5'-acetoxy - $\Delta^{2'}$ - pentenyl-2')]-formaminomethyl-pyrimidine (referred to as D. A. T. for short) and their hydrochlorides, being free of any objectable odor, are most suitable for such a purpose.

Moreover, these derivatives are efficiently utilized, since they are not invalidated by aneurinase and can be reserved for a long time in the body ("Vitamins," Japan Vitamin Society, 6, 684–5 (1953), 7, 125 (1954); J. Pharm. Soc. Japan 73, 705 (1953)). On account of these characters, it appears that they are far more effective than thiamine hydrochloride when used as an enriching agent.

For the preparation of enriched cereal grains with these derivatives, the following steps are employed.

That is, cereal grains are immersed in a solution of these derivatives of thiamine in a volatile solvent thoroughly, and then the grains are taken out and dried. As to the volatile solvent, it is favorable to use one having a low boiling point. Accordingly, there may be often used aliphatic alcohols and ketones of low molecular weight, such as ethanol, methanol and acetone besides water and aqueous media. Strong heating or cooling is not necessary during the immersion. It can be successfully performed at a temperature range from about 10° C. to about 50° C. or generally at room temperature. Several hours are generally enough for the immersion, though it depends upon the temperature and the quantity of cereal grains used.

The invention can also be carried out by spraying the above mentioned solution of derivatives of thiol form thiamine on the surface of cereal grains and drying.

For the purpose of minimizing waste of the thiamine derivatives and to simplify the process of drying, it is desirable to use as smalll quantity of the solvent as possible within the limit of being able to dissolve the fortifying substance completely and to soak the grains uniformly.

The amount of derivatives of thiol form thiamine to be absorbed by the cereal grains is decided depending upon the absorptive power of the grains and upon the ratio of the enriched grains to the ordinary grains to be mixed. This is from about 0.01 g. to about 0.2 g. per 100 g. of cereal grains, and about 0.1 g. to about 0.2 g. is generally advisable. Considering the standard quantity required for fortification of cereal grains, a larger amount than this is unnecessary and, furthermore, it makes it difficult to mix the enriched grains with the ordinary grains uniformly. On the other hand, a smaller amount is also not good, for it causes too much increase in the ratio of the enriched grains to the ordinary grains. Further, this range of amount is suitable from a standpoint of storage of the fortified material without any decrease in vitamin-$B_1$ potency.

The enriched grains thus obtained do not lose their potency through washing with water even though a steaming process is omitted. When about 100 g. of ordinary unenriched cereal grains mixed with 10 g. to 1 g. of these enriched ones are used, the amount of vitamin-$B_1$ enough for an adult in a day can be taken.

Instead of enriching 100 g. of cereal grains with 0.01 g. to 0.2 g. of these thiamine derivatives, 100 g. of the grains can be fortified with only 0.5 to 2 mg. of the compounds. In that case the enriched grains are used for food as such.

Salts of derivatives of thiol form thiamine, such as hydrochloride, are soluble in water and easily soluble in dilute acid.

In order to fortify grains with the hydrochloride, the method stated above may be employed, but another process is also available. For example, after the grains are allowed to absorb a solution of this compound or the corresponding free base in acidic water which contains volatile acid like acetic acid or hydrochloric acid through the same steps described before, they are treated with steam so as to form a thin layer of paste over the surface of grains and at the same time to evaporate the volatile acid. The time of steaming must be short. About 30 seconds to about 200 seconds is suitable. Too long steaming does harm, for paste formation will go too far. In place of steaming, a neutralizing agent, e. g. sodium bicarbonate, may be used, if desired, to neutralize the excess acid before drying.

The enriched grains, prepared as above, retain their potency even though they may be stored for a relatively long period before use. The quantitative analysis of thiamine derivatives after standing for six months revealed only a little decrease in their potency and showed that the aim of enrichment can be attained effectively by the method.

For instance, there follow some data in which D. B. T. and thiamine hydrochloride are compared with each other.

(1) The solubility of the compounds in water, alcohol and acetone.

|  | per 1 D. B. T. | per 1 D. B. T. HCl-salt | per 1 VB$_1$ HCl-salt |
|---|---|---|---|
| Water | 9,000 | 500 | 1 |
| 95% alcohol | 870 | insoluble | 100 |
| acetone | 200 | 50 | insoluble |

(2) The results of the elution test of the rice enriched with the two vitamins.

About five times, in weight of water was added to 1 g. of the enriched rice (which contains 1.2 mg. of D. B. T. or thiamine hydrochloride), and after standing with occasional stirring the quantity of the compound, eluted by water, was measured.

| Elution result | D. B. T., percent | VB$_1$ HCl-salt, percent |
|---|---|---|
| Hour: | | |
| after 5 min | 4.4–4.8 | 12–14 |
| after 10 min | 5.6–5.8 | 17–20 |
| after 20 min | 5.9–6.5 | 25–26 |

(3) The comparison of the stability of two vitamins during boiling of the enriched rice. One gram of the enriched rice was added to 99 g. of ordinary rice and the mixture was boiled and the amount of the vitamin was measured.

Remaining amount, percent
D. B. T _____ 95.6
VB$_1$HCl-salt _____ 85.2

Example 1

5 kg. of cleaned-rice is washed with water and placed in a cylindrical vessel. To this is added a solution of 5 g. of 2-methyl-4-amino-5-[N-(3'-benzoylthio - 5' - benzoxy-Δ$^{2'}$-pentenyl-2')] - formaminomethyl - pyrimidine hydrochloride in 2 l. of water and 0.4 kg. of acetic acid. The vessel is revolved so that the thiamine is absorbed by rice. After about four hours, the absorption is complete. The rice is then taken out from the vessel and exposed to steam for one to three minutes. Thus a paste is formed over the surface and protects the vitamin against falling out from the rice due to mutual contact of the grains and other reasons. Then the rice is allowed to dry.

This enriched rice is mixed with one hundred times as much of ordinary rice and used for food.

Example 2

A solution of 7.2 g. of 2-methyl-4-amino-5-[N-(3'-benzoylthio-5'-benzoxy-Δ$^{2'}$ - pentenyl - 2')] - formaminomethyl-pyrimidine in 1 l. of 80% alcohol is added to 5 kg. of cleaned-rice in a vessel and the vessel is revolved carefully so that absorption takes place. The rice is taken out after three hours. If some alcohol still remains, it is removed by some means and the rice is dried.

The enriched rice thus obtained is used after mixing with ordinary rice.

Test after six months' storage found only 3.6% destruction of the thiamine derivative.

Example 3

50 kg. of cleaned-rice is spread in a thin layer over a board and onto this a solution of 0.5 g. of 2-methyl-4-amino-5-[N-(3'-benzoylthio-5'-benzoxy-Δ$^{2'}$-pentenyl-2')]-formaminomethyl-pyrimidine in 80% alcohol is sprayed. The rice, dried without any other treatment, can be used for food as such.

100 g. of the rice contains 0.987 mg. of the compound.

Example 4

10 kg. of cleaned-rice, after washing with water, is placed in a cylinder and a solution of 10 g. of 2-methyl-4-amino-5-[N-(3'-benzoylthio-5'-benzoxy-Δ$^{2'}$-pentenyl-2')]-formaminomethylpyrimidine in a mixture of 0.8 kg. acetic acid and 1 l. water is added. The vessel is revolved just as described in Example 1. After completion of the absorption, a solution of 5.5 g. of sodium bicarbonate in small quantity of water is added and the revolution is repeated again. By this way, the hydrochloric acid is neutralized and the thiamine derivative is freed. As this is less soluble in water, the loss of the thiamine derivative during boiling can be diminished. Finally, after process of steaming for one to three minutes, the rice is dried.

I claim:

1. A method for enriching grains with 2-methyl-4-amino-5-[N-(3'-benzoylthio-5'-benzoxy-Δ$^{2'}$-pentenyl-2')]-formaminomethyl-pyrimidine hydrochloride and for enhancing their storability without deterioration which comprises immersing grains in an aqueous acetic acid solution of said compound in order to make grains absorb said compound, neutralizing the enriched grains with an aqueous solution of alkaline bicarbonate and drying the resulting enriched grains.

2. A method for enriching grains with 2-methyl-4-amino-5-[N-(3'-benzoylthio-5'-benzoxy-Δ$^{2'}$-pentenyl-2')]-formaminomethylpyrimidine hydrochloride and for enhancing their storability without deterioration which comprises immersing grains in an aqueous acetic acid solution of said compound in order to make grains absorb said compound, steaming the surface of the grains for from about 30 seconds to about 200 seconds and drying the resulting enriched grains.

3. Cereal grains enriched with a fortifying agent and being of enhanced stability to storage, said fortifying agent being fixed in and upon the grains and being selected from the group consisting of 2-methyl-4-amino-5-[N-(3'-benzoylthio-5-benzoxy-Δ$^{2'}$-pentenyl-2')]-formaminomethyl-pyrimidine and its hydrochloride.

References Cited in the file of this patent

UNITED STATES PATENTS

| 2,390,210 | Fieger et al. | Dec. 4, 1945 |
| 2,468,930 | Huber | May 3, 1949 |
| 2,475,133 | Furter et al. | July 5, 1949 |
| 2,694,642 | Westphal et al. | Nov. 16, 1954 |

OTHER REFERENCES

Chemical Abstracts, 48, 1954, 7017a.

UNITED STATES PATENT OFFICE

CERTIFICATE OF CORRECTION

Patent No. 2,811,447 October 29, 1957

Masaki Kamada

It is hereby certified that error appears in the above numbered patent requiring correction and that the said Letters Patent should read as corrected below.

In the grant, line 3, and in the heading to the printed specification, line 6, address of assignee, for "Higashi-ku, Japan" read -- Higashi-ku, Osaka, Japan --; column 2, line 22, for "smalll" read -- small --.

Signed and sealed this 19th day of August 1958.

(SEAL)
Attest:

KARL H. AXLINE
Attesting Officer

ROBERT C. WATSON
Commissioner of Patents